United States Patent [19]

Strosser et al.

[11] Patent Number: 4,924,405
[45] Date of Patent: May 8, 1990

[54] ROUND BALER WITH CONTINUOUS BALE SIZE MONITORING

[75] Inventors: Richard P. Strosser, Akron; Edward J. Wynn; Mark K. Chow, both of Leola; Stephen C. Schlotterbeck, New Holland, all of Pa.

[73] Assignee: Ford New Holland, Inc., New Holland, Pa.

[21] Appl. No.: 333,152

[22] Filed: Apr. 4, 1989

Related U.S. Application Data

[62] Division of Ser. No. 49,874, May 14, 1987, Pat. No. 4,855,924.

[51] Int. Cl.$^5$ .............................. G06F 15/46
[52] U.S. Cl. .................... 364/468; 364/146; 364/400; 364/562; 56/341; 56/DIG. 15; 100/4; 100/45; 100/49; 100/99
[58] Field of Search ............... 364/400, 468, 469, 562, 364/146, 170; 56/341, DIG. 15; 100/3–5, 43, 45, 48, 49, 88, 99

[56] References Cited

U.S. PATENT DOCUMENTS

| | | | |
|---|---|---|---|
| 4,433,533 | 2/1984 | Giani | 100/99 |
| 4,466,231 | 8/1984 | Rowland-Hill et al. | 56/10.2 |
| 4,517,795 | 5/1985 | Meiers | 100/88 |
| 4,624,179 | 11/1986 | Yves et al. | 100/99 |
| 4,674,403 | 6/1987 | Bryant et al. | 100/88 |
| 4,686,820 | 8/1987 | Andra et al. | 100/88 |
| 4,750,323 | 6/1988 | Sheehan et al. | 100/88 |

Primary Examiner—John R. Lastova
Attorney, Agent, or Firm—Griffin, Branigan & Butler

[57] ABSTRACT

A potentiometer is driven by one of the serpentine arm assemblies used to maintain apron tension during formation of a round bale so that the output of the potentiometer continuously provides an indication of the size of a bale being formed in the baler. A microprocessor based control circuit senses the output of the potentiometer, converts it to a digital value, and compares the digital value with a value representing a desired bale size. When the two values are equal, the microprocessor computes the number of revolutions of a net feed roll that is required to wrap the bale a preselected number of times, energizes the net feed roll mechanism to feed net into the bale forming chamber, and counts the revolutions of the net feed roll. When the required amount of net has been dispensed, the microprocessor stops the net feed roll and activates a mechanism to cut the net. The size of a "full bale" is selected by actuating keys on a control panel. An offset is automatically provided to compensate for wear in the apron mechanism affecting the "zero" setting of the bale size sensor. The system permits signalling the operator to steer left or right along a windrow to control bale shape as the bale being formed in the chamber increases in diameter, the signalling rate being non-linear with respect to bale diameter.

12 Claims, 5 Drawing Sheets

ROUND BALER WITH CONTINUOUS BALE SIZE MONITORING

This is a division of application Ser. No. 049,874, filed May 14, 1987, now U.S. Pat. No. 4,855,924.

RELATED APPLICATIONS

This application is related to the application of John H. Merritt and Paul S. Shenberger, Ser. No. 45,977, filed May 1, 1987 entitled Net Dispenser Drive For Round Balers, and U.S. Pat. Nos. 4,426,833 and 4,609,984, the disclosures of which are incorporated herein by reference.

BACKGROUND OF THE INVENTION

The present invention relates generally to round balers for forming a cylindrical bale of crop material, and more particularly to apparatus for continuously monitoring bale size (diameter) whereby the operator may select a desired bale size and/or netting may be dispensed to wrap a bale, the length of netting dispensed being dependent on the size of the bale.

Round balers for forming cylindrical bales of crop material have long been known in the art. It has been conventional to provide such balers with a twine dispensing means for wrapping a formed bale with twine so that the bale will maintain its shape and compactness after being ejected from the baler. A recent development, exemplified by the Claas Model 44 round baler, is the provision of a net dispenser, rather than a twine dispenser, whereby a formed bale is wrapped with a length of net material. As exemplified by U.S. Pat. No. 4,603,379 it is also known to automate round balers so that when a full bale is formed the wrapping apparatus is activated to wrap the bale and cut the wrapping material. While these devices are satisfactory for automatically wrapping full bales, the size of a full bale is fixed because sensor switches are utilized to determine when a bale has reached a predetermined size. On the other hand, it is frequently desirable to automatically wrap a completed bale even though it is not large enough to actuate the full bale sensor. This might occur, for example, when the farmer wishes to form smaller bales to better fit into a truck or storage space of given dimensions, or when only a partial bale has been formed at the end of a field. Thus, it is desirable to be able to continuously monitor bale size so that an operator may select the size of bales to be formed, and the bales may be wrapped with the minimum amount of wrapping material required to hold the bale intact.

In the copending application of Richard P. Strosser et al. Ser. No. 46,614, now U.S. Pat. No. 4,748,802, filed May 7, 1987 there is disclosed an apparatus for monitoring the shape of a bale by sensing the size of a bale and lighting first one and the other of two indicators to signal the operator to steer right or steer left along a windrow, the result being that crop material is added toward first one end and then the other end of the bale being formed. This enables the building up of a generally cylindrical bale of uniform density. However, the mechanism disclosed therein senses the bale diameter only at fixed, equally spaced, bale diameters. When heavy crop conditions are encountered at small bale diameters there is a rapid lighting of first one and then the other indicator at a rate too fast for the operator to follow. Also, the last few inches of bale diameter are built up more toward one end of the bale thus giving a bale of non-uniform diameter. The continuous bale size sensor disclosed herein permits the lighting of the indicators at nonfixed increments of bale diameter, the increments being larger at the smaller bale diameters. This alleviates both the problem of too-fast switching between lights and the problem of non-uniform diameter.

The bale size sensor disclosed in the Strosser et al. application is actuated by a serpentine arm which maintains tension in the apron as bale size increases. As the apron and its support mechanism wears, the bale size sensor indicates a bale size greater than the actual size of the bale in the baler. The continuous bale size sensor provided by the present invention permits automatic compensation for wear so that a true indication of bale size is always available.

SUMMARY OF THE INVENTION

An object of the present invention is to provide a round baler wherein the bale size sensor continuously monitors the diameter of a bale as it is formed, and produces an output signal indicative of the bale diameter.

A further object of the invention is to provide a bale size sensor for continuously monitoring the diameter of a bale as it is being formed, an operator's control panel at which an operator may select a desired bale size, an indicator, and a control circuit for comparing the output of the sensor to the desired bale size and lighting the indicator when the comparison shows that the actual bale size is at least as great as the desired bale size.

An object of the present invention is to provide a round baler as described above wherein the operator may select the number of wraps of wrap material to be wrapped around each bale, and the control circuit controls the dispensing of the wrap material to automatically wrap a formed bale with the selected number of wraps.

An object of the present invention is to provide a round baler as described above wherein the control circuit includes means for compensating for the effects of mechanical wear of certain baler parts on the accuracy of the bale size sensor.

Another object of the invention is to provide a round baler with a sensor for continuously sensing bale size, a plurality of indicators for directing an operator to steer left or steer right along a windrow, and a control circuit responsive to the sensor for selectively energizing the indicators whereby a cylindrical bale of generally uniform diameter and density is formed if the operator steers as directed by the indicators.

The objects of the invention are attained by providing a potentiometer for sensing bale size. The potentiometer shaft is connected to one of the serpentine arms which maintains tension on the apron so that as the size of a bale being formed increases and the apron expands, the serpentine arm moves the potentiometer shaft. The potentiometer is connected to an analog to digital converter which converts the analog output signal into digital pulses which are accumulated to obtain a digital value representing bale size. Switches and indicators are provided on an operator's control panel. By actuating the switches the operator may select a desired bale size and also the number of wraps of wrapping material to be wrapped around each bale. A microprocessor based control circuit compares the bale size to the desired bale size and signals the operator when a bale has reached the desired size. The control circuit then automatically computes the number of rotations of a feed roll required to wrap the bale with the selected number of wraps of wrapping material, initiates the wrapping, and activates a knife to cut the wrapping material when the bale is wrapped.

To compensate for errors in the output signal from the potentiometer resulting from wear in the apron and other mechanical parts of the baler, provision is made for determining the sensor output when the bale forming chamber is empty, the sensed value then being used as a correction factor subtracted from the sensor output signal.

The control circuit includes a table stored in memory and addressable by the output of the bale size sensor. At each location in the table signals are stored for selectively energizing two indicators to signal the operator to steer left or steer right along a windrow.

Other objects of the invention and its mode of operation will become apparent upon consideration of the following description and the accompanying drawings.

DESCRIPTION OF THE PREFERRED EMBODIMENT

Figure 1:
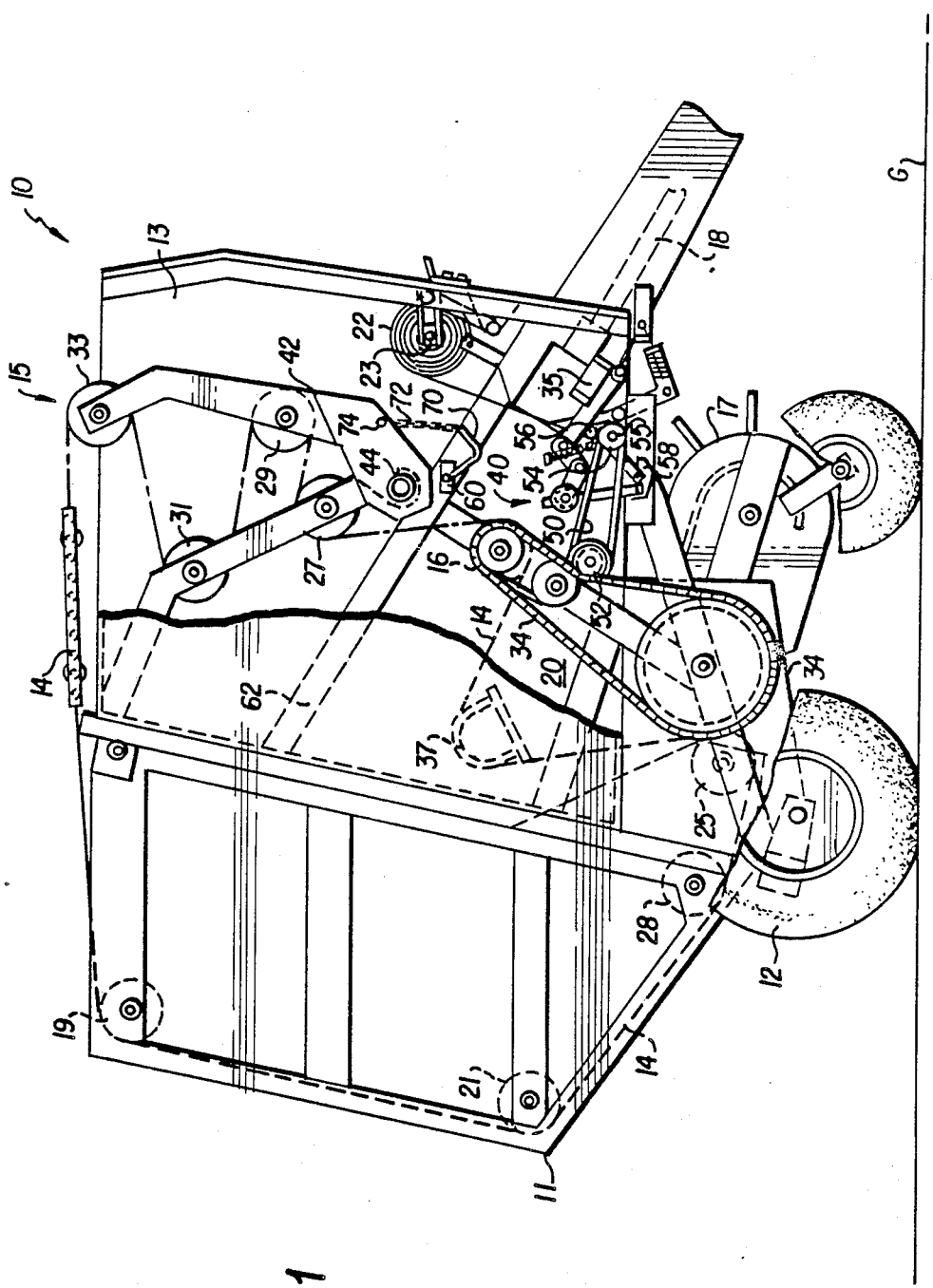
FIG. 1 is a side elevation view of a round baler with a net dispensing apparatus.

FIG. 1 is a right side elevational view of a round baler 10 with which the present invention may be utilized. Left and right references are used herein as a matter of convenience and are determined by standing at the rear of the baler facing the forward end, the direction of travel. The baler 10 is provided with a wheeled frame 12 and is adapted for movement over the ground G. The frame supports a pair of generally vertical, transversely spaced apart side sheets 13 between which a chain-and-slat or other bale forming apron 14 is rotatably driven. At each side, the apron 14 extends over sprocket 16, a cam guide member 37, and a series of rotatable guide members 19, 21, 28, 25, 27, 29, 31 and 33. A drive train 18 provides operational power to all operable components within the baler 10 including a floor roller (not shown) extending transversely of the baler generally behind sprocket 34. A pickup 17 positioned adjacent the ground G delivers crop material to a bale forming chamber 20 bounded by the apron 14 and the floor roller. As crop material is fed into the chamber it is rotated between the apron and floor roller to form a cylindrical bale which increases in size as more crop material is introduced. As the bale increases in size it presses against the apron 14. A serpentine mechanism, generally indicated at 15, includes a pair of arm assemblies 42, one at each side of the baler, and each mounted on a transversely extending pivot tube 44 mounted at each side in bearings. As the bale increases in size and presses against apron 14, arm assemblies 42 pivot in a counter-clockwise direction with the pivot tube 44 being the pivot. This allows the size of the bale forming chamber 20 to increase while at the same time removing slack from the apron.

The round baler 10 as described above is of generally conventional construction and is described in a number of patents including U.S. Pat. No. 4,426,833 issued to Willis R. Campbell. The baler 10 may be modified as taught in the copending application of John H. Merritt et al. referenced above to provide a net dispensing means for wrapping a formed bale with netting. As illustrated in FIG. 1, a roll of netting material 22 is mounted on a spindle 23. A drive belt 50 extends from a drive pulley 52 to a driven pulley 54. Attached to the shaft 55 of the driven pulley is a transversely extending feed roll. The pulley 52 is driven as long as power is applied at 18. The belt 50 is normally slack so that pulley 54 is not driven. When a linear actuator 35 is energized a clutching mechanism, indicated generally at 40, presses against and tensions belt 50 thereby causing pulley 54 to be driven. The pulley 54 cooperates with a pair of pinch rollers 56 to pull netting from the roll 22 and dispense it into the bale forming chamber. The actuator 35 and clutching mechanism 40 also drive a net knife 58 so that the net is cut as tension is removed from belt 50, as more fully explained in the aforementioned application of Merritt et al.

Generally speaking, the baler 10 is pulled along a windrow and the pickup 17 picks up crop material and feeds it into the bale forming chamber 20. The crop material is rotated between the floor roller and apron 14 to form a bale of ever-increasing size. When a "full bale" has been formed, the operator stops forward motion of the baler to thereby stop the feeding of crop material into the baler. However, rotation of the bale in the chamber is continued and the net feed mechanism is actuated to feed netting into the chamber 20 where it wraps around the rotating bale. After the bale is wrapped, knife 58 cuts the net. The operator may then actuate a control to open a tailgate 11 and eject the rolled and wrapped bale. The operator then closes the tailgate and resumes forward motion of the baler to begin forming a new bale.

Figure 3:
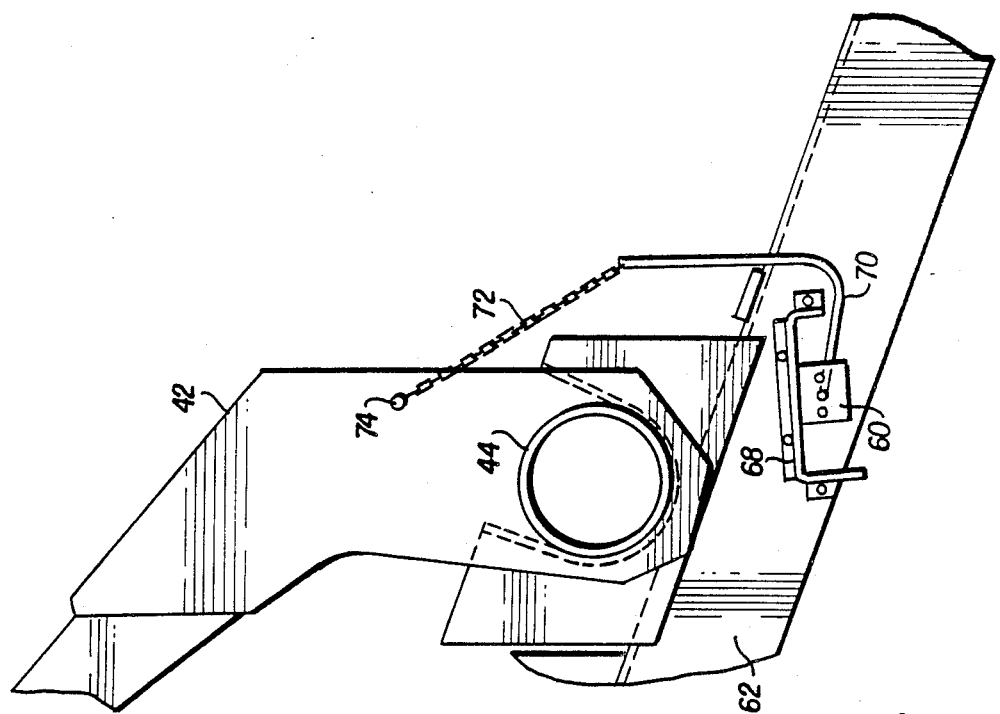
FIGS. 2 and 3 are side views of a serpentine arm and a linkage for operating a continuous bale size sensor.
Figure 2:
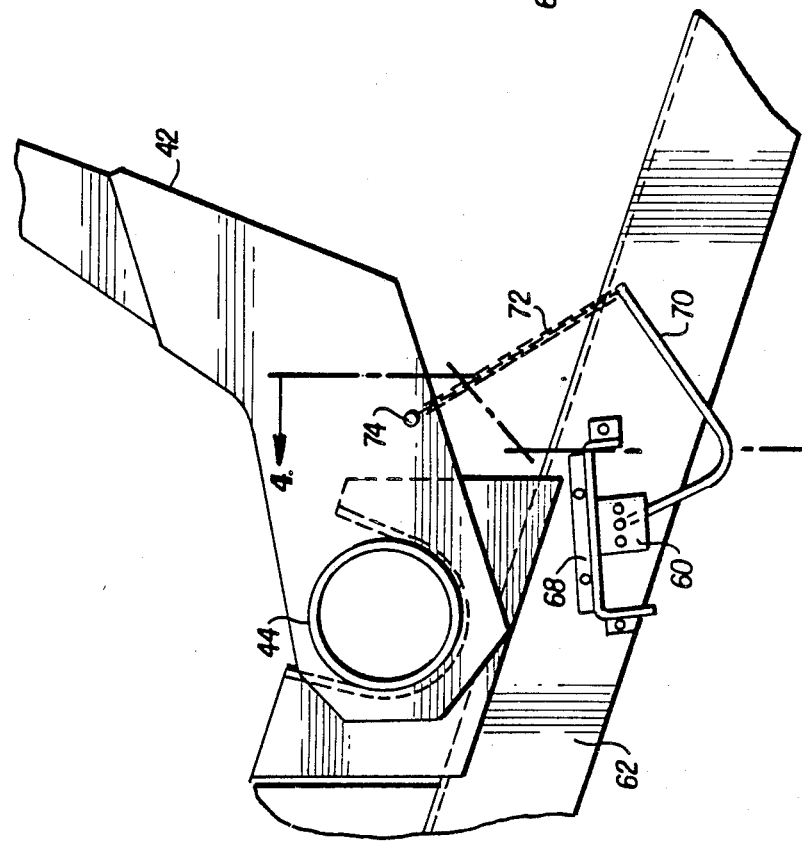
Figure 4:
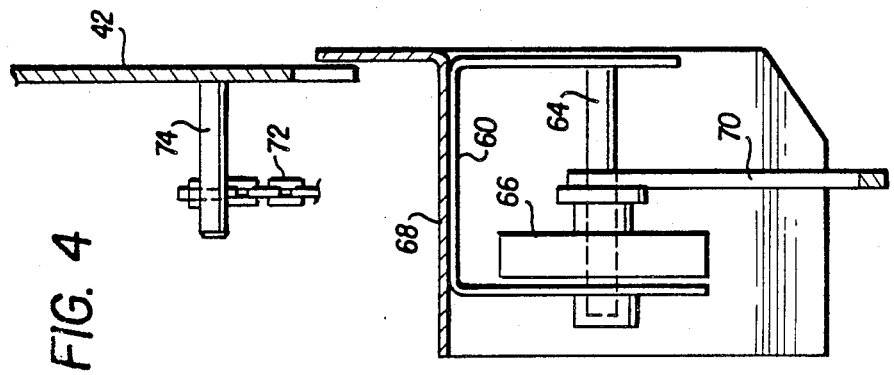
FIG. 4 is a view taken along the line 4—4 of FIG. 2 showing the mounting of the continuous bale size sensor.

In accordance with one aspect of the present invention a bracket 60 is mounted on a frame member 62 to support a rotary potentiometer which serves as a continuous bale size sensor. As shown in FIGS. 2-4, the bracket 60 is generally U-shaped and has holes in the opposing legs for supporting the shaft 64 of rotary potentiometer 66 The potentiometer is attached to one leg of bracket 60 and the bracket is attached to a further bracket 68 which is in turn attached to the frame member 62. A curved elongated arm 70 is attached at one end to the potentiometer shaft 64. At the opposing end the arm 70 is attached by a chain or other flexible link 72 to a pin 74 extending outwardly of serpentine arm 42.

At the beginning of formation of a bale the serpentine arms 42 are in the position illustrated in FIGS. 1 and 2. As crop material is fed into the bale forming chamber the size of the bale being formed therein increases and presses against the apron 14. The tension in the apron, acting through rotatable guide members 29 and 33 pivots the serpentine arms 42 clockwise about the pivot tube 44. As the arm 42 (FIG. 3) pivots, it carries pin 74 thus applying a force through chain 72 and curved arm 70 to rotate the potentiometer shaft 64. When the apron 14 has been extended to its limit the serpentine arm 42 is in the position illustrated in FIG. 3.

After the tailgate 11 is opened and the formed and wrapped bale ejected from the rear of the baler the serpentine arm 42 is returned to its starting position (FIG. 2) by a spring or other suitable means well known in the art. The weight of the curved arm 70 and chain 72 are sufficient to rotate the potentiometer shaft 64 back to its initial position. However, a return spring may be provided for lever 70 if desired.

Figure 5:
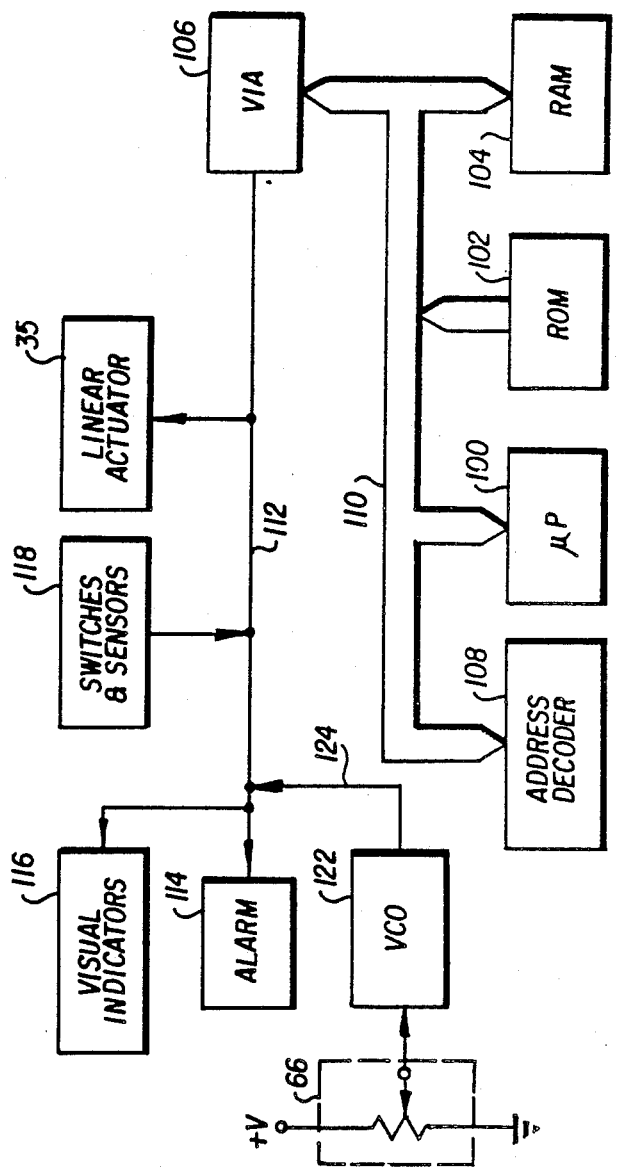
FIG. 5 is a block circuit diagram of a control circuit for an automatic round baler.

FIG. 5 illustrates how the potentiometer 66 may be incorporated into a round baler microprocessor-based control circuit such as that described in Strosser et al. U.S. Pat. No. 4,609,984. The control circuit is essentially the same as that disclosed in the patent in that it includes a microprocessor 100, a ROM 102, a RAM 104, a versatile interface adapter (VIA) 106 and an address decoder 108 interconnected by address, control and bidirectional data busses collectively designated 110. As in the Strosser et al. patent, the control circuit also includes input/output busses 112 connecting the VIA 106 with a audible alarm 114, visual indicators 116, and various switches and sensors collectively designated 118. In accordance with one aspect of the present invention the full bale switch of the Strosser et al. patent is replaced with the continuous bale size sensing potentiometer 66. A voltage controlled oscillator or other suitable analog to digital converter 122 is connected to receive the analog output signal from potentiometer 66 and convert it to digital pulses on lead 124, the pulses on lead 124 having a frequency proportional to the magnitude of the analog signal from sensor 66 and thus indicative of the size of the bale being formed in the baler 10. The signals on lead 124 are applied over one of the lines in busses 112 to the VIA 106 where they may be counted over a fixed interval of time by a timer in the VIA to thus obtain a digital value representing the size of the bale being formed.

Figure 6:
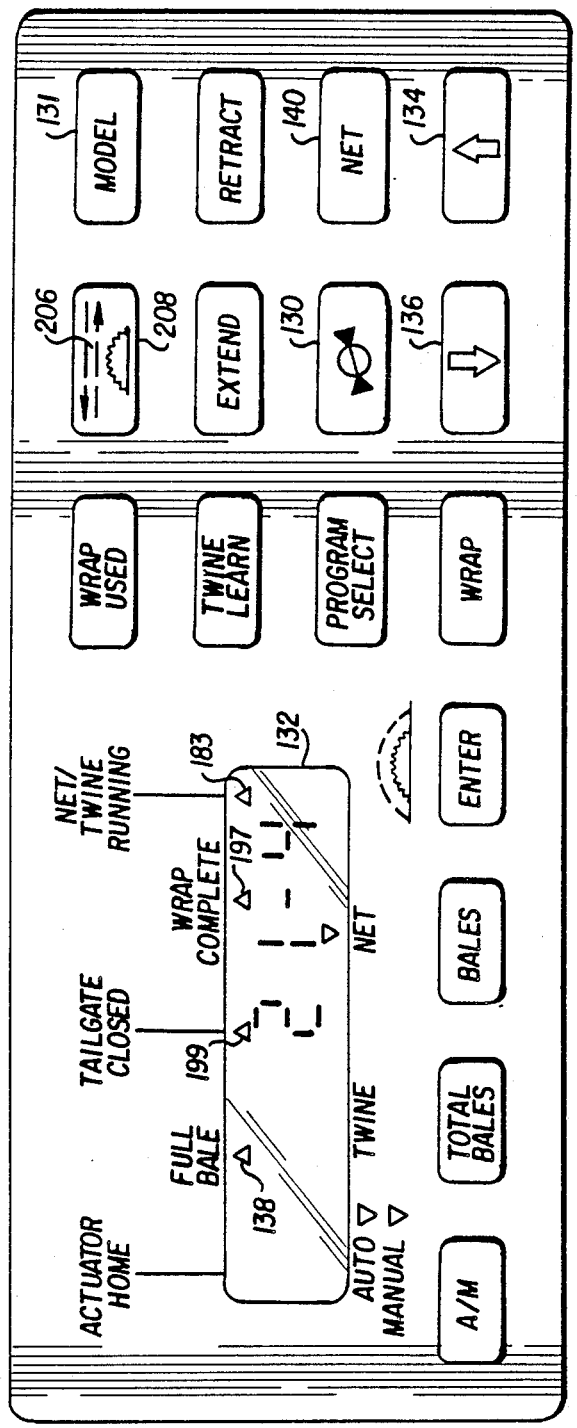
FIG. 6 shows an operator control panel with switches and indicators.

When a net rather than twine is used to wrap the bales, the motor disclosed in the Strosser et al. patent for driving the twine dispensing mechanism is not required. Instead, the linear actuator 35 for controlling the net drive roll shaft 55 and knife 58 is connected to the VIA bus 112. Also, it will be recognized that the manual input switches 118 and visual indicators 116 are somewhat different. FIG. 6 is a diagram of the operator's control panel illustrating the various manual input switches and visual indicators. The control panel is designed for use with a round baler having either a twine dispensing mechanism or a net dispensing mechanism, and also including other features not related to the present invention, so for present purposes certain of the switches and indicators may be disregarded. Model switch 131 is actuated to select the type of baler being controlled. Although a baler having a net dispenser is described herein it should be understood that the principles of the invention are equally applicable to balers having a twine dispensing mechanism.

In FIG. 6, the bale size switch 130 is depressed when the operator desires to display the selected size of the bales to be formed. When the switch is depressed the last selected bale size appears in the digital display window 132. This value may then be incremented by depressing switch 134 while holding the bale size switch depressed. The bale size may be selected, for example, in one inch or one centimeter increments. The displayed value may be decremented by depressing switch 136 while holding the bale size switch depressed. As described below, when the bale size sensor 66 produces an output signal whose value corresponds to the bale size entered into the display, the microprocessor 100 produces a signal which passes through VIA 106 to turn on a Full Bale indicator 138.

The Net switch 140 is used in conjunction with the switches 134 and 136 to select the number of wraps of wrapping material (net or twine) to be applied to each bale. When the Net switch is depressed the last selected number of wraps appears on the digital display 132 and this value may be incremented or decremented by depressing one of the switches 134 or 136 while the Net switch is held down. The number of bale wraps may be selected in, for example, ¼ wrap increments. FIG. 6 shows the digital display after the operator has selected two and one-quarter as the number of wraps of net to be applied to each bale.

Figure 7:
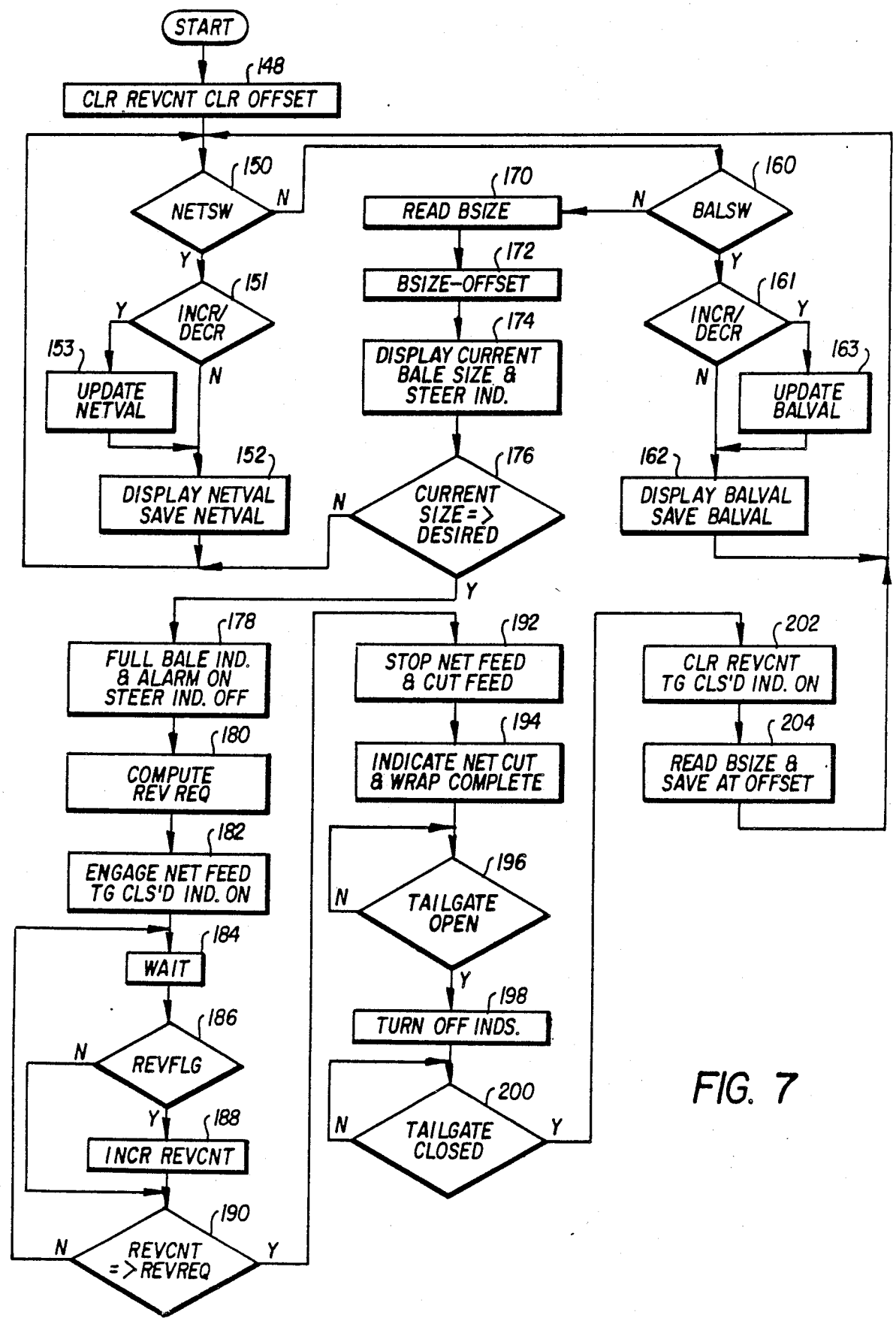
FIG. 7 is a flow diagram illustrating operation of the control system to wrap a bale of any size with a preselected number of wraps of a netting material.

FIG. 7 is a flow diagram illustrating the program of operation of the FIG. 5 control circuit to control the wrapping of a bale with netting. The program begins at step 148 by clearing various register locations including REVCNT and OFFSET. At step 150 the microprocessor 100, acting through VIA 106, samples the Net switch flag NETSW to see if Net switch 140 has been microprocessor next samples flags for increment/decrement switches 134 and 136 at step 151 to determine if either switch is also depressed. If not, the microprocessor sends a stored value NETVAL representing the last selected number of wraps to the VIA 106 and the VIA outputs signals to display the value on display 132. On the other hand, if the test at step 151 shows that one or the other of switches 134 and 136 is actuated the program branches to 153 to increment or decrement NETVAL and then sends the updated value to the display 132 at step 152. NETVAL is also saved at step 152 after which the program loops back to step 150.

The loop comprising steps 150-153 is repeatedly executed as long as the Net switch 140 is depressed. During each execution of the loop steps 150-152 are executed if neither of the increment/decrement switches 134, 136 is actuated. In addition, step 153 is executed if one of switches 134, 136 is actuated.

If the test at step 150 indicates that the Net switch 140 is not actuated the program branches to step 160 where the flag BALSW is tested to see if the Bale switch 130 is depressed. If it is then the microprocessor program executes the loop comprising steps 160-163. Steps 160-163 serve the same purpose as steps 150-153 except that they control the display of bale size on the display 132. Thus, BALVAL, the last selected bale size is displayed and saved at step 162 after possibly being updated at step 163 because one of switches 134, 136 is depressed.

When the test at step 160 shows that the Bale switch flag is not set the program branches to step 170 where the microprocessor obtains from VIA 106 the digital value representing the converted output of the bale size sensor 66 (i.e. bale size) and saves it at location BSIZE.

To digress for a moment, it is well known that wear occurring in the links of apron 14 and its drive sprockets and pulleys effectively increases its length. This means that for a given size bale in the baler chamber 20 the serpentine arm 42 is offset in the clockwise direction (FIGS. 2 and 3) from its "no-wear" position the offset becoming greater as the wear and effective length of the apron increases. Accordingly, the arm 70 and chain 72 rotate the shaft of the potentiometer 66 so that its output signal also varies as the apron wear increases Thus, the output of the potentiometer indicates a bale size which is less than the true size of the bale in the chamber. To overcome this problem, the output of the potentiometer 66 is sensed when the bale forming chamber is empty and the tailgate 11 is closed. This is accomplished during execution of program step 204 as subsequently described, and the output of the potentiometer, after conversion to a digital value by VCO 122 and VIA 106, is stored at OFFSET for use on the next baling cycle as a correction factor.

Returning to FIG. 7, at step 172 the microprocessor subtracts OFFSET from BSIZE to obtain a corrected value representing the actual size of the bale currently being formed in the bale forming chamber. On the first cycle OFFSET will be zero since it is cleared at step 148, but during formation of the second and subsequent bales OFFSET will have the value sensed at step 204 of the preceding bale forming cycle. The corrected bale size value is sent to VIA 106 at step 174 so that it is displayed on the digital display 132.

At step 176 the microprocessor compares the corrected digital value representing actual or current bale size to the digital value representing the desired bale size selected by operation switches 130, 134 and 136. If the current bale size is less than the desired size the program loops back to step 150. During this interval the baler is still being moved along a windrow and crop material is being added to the bale being formed in the chamber 20. Eventually the test at step 176 will find that the current bale size is equal to or greater than the desired bale size at which time the to sound the audible alarm 114 and light the full bale indicator 138. This signals the operator that he should stop forward movement of the baler.

Next, the microprocessor 100 computes (at step 180) the number of revolutions of the net feed roll required in order to wrap the bale with the number of wraps previously selected by operation of switches 134, 136 and 140. This can be done in different ways, a preferred method being as follows. After the output of bale size sensor 66 is converted to a digital value and corrected as described above, it is used to address a table of values, one for each possible bale size selectable by operation of switches 130, 134 and 136. At each table address there is stored a precomputed value representing the number of revolutions of the net feed roll required to feed enough net to encircle a bale of a given selected size with one complete wrap of the net. The value read from the table is then multiplied by the number of wraps (e.g. full and partial wraps) entered by means of switches 134, 136 and 140 to obtain a final value indicating the number of revolutions of the net feed roll required After the number of revolutions of the net feed roll has been computed, the microprocessor 100 then sends commands (step 182) to VIA 106 to energize the linear actuator 35. As previously explained, energizing linear actuator 35 applies tension to belt 50 so that the pulley 54 rotates the net feed roll shaft 55. When the net is caught up in the rotating bale its speed increases and at that time the "net running" indicator is turned on.

A switch 118 is provided for sensing revolutions of the net feed roll shaft 55. Each time the switch is actuated it produces a signal on one of the VIA busses 112. As explained in the Strosser et al. patent, the microprocessor periodically interrupts, at intervals of about 10 milliseconds, the routine it is executing and executes a Non-Maskable Interrupt (NMI) routine to sample the states of the various sensors and switches 118 and perform other functions. After the NMI routine is executed the program returns to the interrupted routine and continues its execution from the point at which it was interrupted. Each time an NMI routine is executed the output of the feed roll switch sets or resets a flag REVFLG. At step 184 the microprocessor executes a Wait For Interrupt instruction waiting for the interrupt. After the NMI routine is executed to set or reset REVFLG, it is tested at step 186 and if it is set the program executes step 188 which increments the count location REVCNT. This location in RAM 104 is utilized to count the number of revolutions of the net drive roll. At step 190 REVCNT is compared with the number of revolutions required as computed at step 180. If REVCNT is not equal to or greater than the number of revolutions required the program loops back to step 84. The loop comprising steps 184, 186, and 190 is repeated and, if REVFLG is set during execution of the loop step 188 is executed to increment REVCNT. The speed of the net feed roll shaft is preferably sensed during execution of this loop to control the "net running" indicator as previously described When the comparison at step 190 indicates that REVCNT is equal to or greater than the number of revolutions required to wrap the bale with the selected number of wraps of netting, the program proceeds to step 192 where a signal is sent to VIA 106 to deenergize linear actuator 35 This releases tension in belt 50 so that the net feed roll stops turning and also actuates the knife 58 so that the net is cut.

At step 194 the microprocessor sends a code to VIA 106 which turns off the "net running" indicator 183 and turns on the wrap complete indicator 197 and the audible alarm 114. This signals the operator that he should operate the control to open the tailgate to eject the rolled and wrapped bale.

At step 196 the program executes a loop during which the tailgate sensor switch is repeatedly sampled to see if the tailgate is open. When the tailgate opens the microprocessor executes step 198 to turn off the full bale, wrap complete, and tailgate closed indicators 138, 197 and 199 and remove the current bale size indication from the digital display 132.

At step 200 a loop is executed waiting for the operator to operate the control for closing the tailgate. When the tailgate closes the tailgate closed indicator 199 is again turned on (step 202). REVCNT is also reset at this time.

At step 204 the microprocessor obtains from VIA 106 the digital value representing the output of the bale size sensor 66 and stores it at OFFSET for use as the bale size correction factor at step 172 during formation of the next bale. After execution of step 204 the program loops back to step 150, ready to monitor the formation and wrapping of the next bale.

The pickup of a round baler is wider than a windrow hence as a bale is building up the baler there is a tendency for the bale to form with a varying diameter and crop density over its length unless the operator "weaves" the baler back and forth along the windrow. In FIG. 6, the control panel is provided with a pair of segmented display arrows 206 which selectively direct the operator to steer left or steer right. These indicators are energized in response to increasing diameter of a bale as sensed by the bale size sensor 66.

In FIG. 7, when the corrected bale size is determined, it is added to the base address of a table. This table stores, at each location, signals for selectively lighting the display arrows 206. When a location in the table is accessed the signals stored therein are sent (at step 174)

to VIA 106 to selectively light one of the indicators. This arrangement permits changing the indicators as the diameter of the bale being formed increases but the changes do not have to occur at equal increments of increase in a bale diameter. For example, the table may be loaded with signals to first indicate steer left, then when the bale diameter reaches 10 inches steer right, when the bale diameter is 18 inches steer left, when the bale diameter is 25 steer right, and so forth. It is even possible to load the table with signals which light individual segments of the directional arrows 206 to provide an indication to the operator as to how far he should steer right or left. Actually, the table may comprise two sub-tables, one for use under heavier crop conditions and the other for use under lighter crop conditions. The operator may actuate switch 208 according to the condition present, and in response to the switch the microprocessor selects the base address of one or the other of the sub-tables.

While a preferred embodiment of the invention has been described in specific detail, it will be understood that various substitutions and modifications may be made in the described embodiment without departing from the spirit and scope of the invention. By way of example, it is not necessary to compute the amount of net fed by computing the revolutions of the net feed roll. Since speed of the net feed roll is sensed to control the "net running" indicator, and since the diameter of the feed roll is known, the microprocessor may utilize these factors to compute the time required to feed the desired amount of net. It is intended therefore to be limited only by the scope of the appended claims.

The embodiments of the invention in which an exclusive property or privilege is claimed are defined as follows.

1. In a round baler having an apron at least partially defining an expandable bale forming chamber and an arm assembly for maintaining tension in said apron as a bale being formed in said chamber expands the chamber by acting against said apron, the improvement comprising:
   bale sensing means connected to said arm assembly for continuously producing an analog output signal representative of the diameter of a bale being formed in said chamber; and means responsive to said analog signal for producing output signals at varying increments of bale size increase said increments of bale size increase being smaller as the diameter of the bale being formed increases.

2. The improvement of claim 1, wherein said increments are relatively large when the diameter of the bale being formed is small and wherein said increments are relatively small when the diameter of the bale being formed is large whereby the diameter of the bale increases generally uniformly along its length during formation thereof when said baler is steered in accordance with said output signals.

3. The improvement of claim 1, wherein said bale sensing means comprises a potentiometer.

4. The improvement as claimed in claim 3, wherein said means responsive to said analog signal comprises microprocessor means responsive to said potentiometer for producing said output signals.

5. In a round baler having an apron at least partially defining an expandable bale forming chamber and a serpentine arm assembly for maintaining tension in said apron as a bale being formed in said chamber expands the chamber by acting against said apron, the improvement comprising a bale sensing potentiometer, means connecting said potentiometer to said serpentine arm assembly whereby said potentiometer continuously provides an output signal representative of the size of a bale being formed in said chamber; means responsive to the output signal from said potentiometer for addressing a table of stored signals; first and second direction indicators; and, means responsive to the stored signals at an addressed location in said table for selectively lighting said indicators to signal an operator where to steer said baler.

6. In a round baler having an apron at least partially defining an expandable bale forming chamber and an arm assembly for maintaining tension in said apron as a bale being formed in said chamber expands the chamber by acting against said apron, the improvement comprising:
   bale sensing means connected to said arm assembly for continuously producing an analog output signal representative of the diameter of a bale being formed in said chamber; and
   means responsive to said analog signal for producing output signals at spaced intervals, the intervals between successive output signals decreasing as the diameter of the bale being formed increases.

7. The improvement of claim 6, wherein said intervals are relatively large when the diameter of the bale being formed is small and wherein said intervals are relatively small when the diameter of the bale being formed is large whereby the diameter of the bale increases generally uniformly along its length during formation thereof when said baler is steered in accordance with said output signals.

8. The improvement of claim 6, wherein said bale sensing means comprises a potentiometer.

9. The improvement as claimed in claim 8, wherein said means responsive to said analog signal comprises microprocessor means connected to said potentiometer for producing said output signals.

10. A round baler having an apron at least partially defining an expandable bale forming chamber and a serpentine arm assembly for maintaining tension in said apron as a bale being formed in said chamber expands the chamber by acting against said apron, said serpentine arm assembly moving as the size of the bale increases, the improvement comprising circuit means for continuously producing an analog output signal, said circuit means including a bale sensing potentiometer for controlling said circuit means to vary the magnitude of said analog output signal, and means comprising a flexible link for connecting said potentiometer to said serpentine arm assembly to move said potentiometer and vary the magnitude of said analog output signal as the size of a bale being formed in said chamber increases.

11. In a round baler having an apron at least partially defining an expandable bale forming chamber and a serpentine arm assembly for maintaining tension in said apron as a bale being formed in said chamber expands the chamber by acting against said apron, the improvement comprising a bale sensing potentiometer, means connecting said potentiometer to said serpentine arm assembly whereby said potentiometer continuously provides an output signal representative of the size of a bale being formed in said chamber; means for sensing the output signal from said potentiometer when said bale forming chamber is empty to develop a correction value, and subtraction means for subtracting said correction value from the output signal produced by said potentiometer when a bale is being formed therein, whereby a correction is made for wear in said apron.

12. The improvement as claimed in claim 11 and further comprising:
   means responsive to the output of said subtraction means for addressing a table of stored signals; first and second direction indicators; and,
   means responsive to the stored signals at an addressed location in said table for selectively lighting said indicators to signal an operator where to steer said baler.

* * * * *